United States Patent [19]

Brogardh et al.

[11] 4,281,245

[45] Jul. 28, 1981

[54] FIBER OPTICAL MEASUREMENT APPARATUS

[75] Inventors: Torgny Brogardh, Vasteras; Leif Stensland, Jarfalla, both of Sweden

[73] Assignee: ASEA Aktiebolag, Vasteras, Sweden

[21] Appl. No.: 43,031

[22] Filed: May 29, 1979

[30] Foreign Application Priority Data

Jun. 2, 1978 [SE] Sweden ............................... 7806486
Dec. 18, 1978 [SE] Sweden ............................... 7812949

[51] Int. Cl.$^3$ ............................................. G02B 5/14
[52] U.S. Cl. ..................................... 250/227; 250/205
[58] Field of Search ........... 250/226, 227, 205, 231 R; 350/96.1, 96.24

[56] References Cited

U.S. PATENT DOCUMENTS

| | | | |
|---|---|---|---|
| 3,709,612 | 1/1973 | Clemens ................................. | 250/227 |
| 3,945,731 | 3/1976 | Graser ................................... | 250/205 |
| 4,045,667 | 8/1977 | Hanson ................................. | 250/226 |

*Primary Examiner*—David C. Nelms
*Attorney, Agent, or Firm*—Watson, Cole, Grindle & Watson

[57] ABSTRACT

The invention relates to an optical measuring device for measuring physical magnitudes such as position, speed, acceleration, force, pressure, elongation, temperature, etc., comprising at least one optical fiber for conducting light between an electronic unit and a transducer forming an optical modulator which is directly or indirectly influenced by the quantity being measured and, in dependence thereon, modulates the light emitted to the transducer. The transducer contains at least one optical filter having spectrally varying absorbing and/or transmitting and/or reflecting characteristics within the spectra of the emitted light. The light filter generates one or more stabilizing signals for the fiber optic and optoelectronics, and possibly one or more measurement signals within one or more wavelength ranges.

26 Claims, 42 Drawing Figures

FIBER OPTICAL MEASUREMENT APPARATUS

BACKGROUND

1. Field Of The Invention

The present invention relates to an optical measuring device for measuring physical magnitudes such as position, speed, acceleration, force, pressure, elongation, temperature, etc., comprising at least one optical fiber for conducting light between an electronic unit and a transducer forming an optical modulator which is directly or indirectly influenced by the quantities being measured and, in dependence thereon, modulates the light emitted to the transducer.

2. Prior Art

A major problem in connection with fiber optical analog transducers is the considerable difficulties in achieving fiber and electro-optical component stability.

SUMMARY OF THE INVENTION

The invention provides a solution to such problems and other associated problems in measuring devices of the kind specified herein. The measuring device according to the invention is characterized in that the transducer contains at least one optical filter having a spectrally varying absorbing and/or transmitting and/or reflecting ability within the spectra of the emitted light. The light filter in the transducer generates one or more fiber optic and optoelectronic stabilization signals and possibly one or more measurement signals within one or more ranges of the wavelength. A measuring device of this kind is stable and has a universal application for fiber optical transducers.

In a preferred embodiment the light filter is arranged, within the light emitted from the transducer within at least one range of wavelengths, to generate a light signal which is less dependent on the measuring quantities than the light within another range of wavelengths of the light emitted from the transducer. In this way a stable measurement and a high accuracy of measurement can be obtained.

In a further preferred embodiment, in which the fiber conducts light from one or more light sources in the electronics unit to the transducer, as well as from the transducer to one or more light detectors in the electronics unit, the transducer comprises at least one optical interference filter which is directly or indirectly influenced by the physical magnitude to be measured, and which modulates the light in the transducer under the influence of that physical magnitude. This invention is characterized in that the physical magnitude is arranged to influence the optical wavelength of the light in the interference layers of the interference filter. This results in movements of the transmission and reflection spectra, which, upon a suitable choice of measuring light wavelength, generates light signals which can be divided into both measuring and stabilization components in the electronics unit.

BRIEF DESCRIPTION OF THE DRAWINGS

The invention is exemplified in greater detail in the accompanying drawings, in which.

DESCRIPTION OF THE PREFERRED EMBODIMENTS

Figure 1:
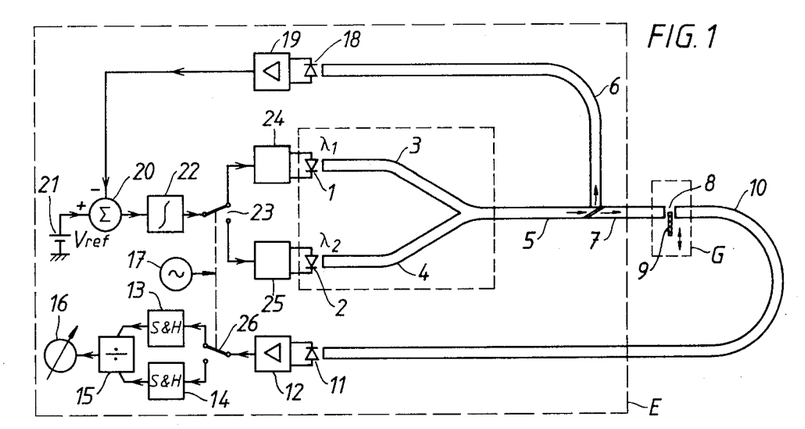
FIG. 1 shows a measuring device having two light sources.

FIG. 1 shows a measuring device according to the invention with two light sources 1 and 2, which emit light with different distributions of wavelength (maximum at the wavelengths $\lambda_1$ and $\lambda_2$, respectively) into light-conducting fibers 3 and 4, respectively, which from two branches are united into fiber 5. The electronics unit is limited by the dash-lined rectangle E and the transducer units by rectangle G. From fiber 5 part of the light is switched via fiber 6 to light detector 18, within electronics unit E, and the photo-current of the light detector is amplified by amplifier 19 and is supplied to subtractor 20 together with reference voltage 21 ($V_{ref}$). The difference output from subtractor 20 constitutes the error signal to regulator 22 which controls light-emitting diode 1 via drive circuit 24, or light-emitting diode 2 via drive circuit 25 in dependence on the position of switch 23. This regulation ensures that the relation between the light intensities from light-emitting diodes 1 and 2 is kept constant. Switch 23 is controlled between its two switch positions by oscillator 17. The light from the light-emitting diodes 1 and 2 in fiber 5 is switched to fiber 7. Fiber 7 conducts light to transducer G, which in this Figure consists of optical filter 9 in gap 8 between fiber 7 for leading in light and fiber 10 for leading out light from transducer G to light detector 11 within electronics unit E. The output signal of light detector 11 is amplified in amplifier 12, and by means of switch 26 the output signal is applied alternately to sample and hold circuits 13 and 14 at the same rate as switch 23 switches in the light-emitting diodes 1 and 2, respectively. Switch 26, as well as switch 23, is controlled by oscillator 17. In this way the output of sample and hold circuit 13 receives a value of the light intensity from light-emitting diode 1 after passage through light conductors 3, 5, 7, 10 and transducer G. The output of sample and hold circuit 14 receives a value of the light intensity from light-emitting diode 2 after passage of the light through conductors 4, 5, 7, 10 and transducer G. In transducer G the position of optical filter 9 is influenced by the quantity being measured (position, speed, acceleration, force, pressure, elongation, temperature, etc.). By choosing filter 9 so that the light from light-emitting diode 1 is influenced more strongly by the movement of filter 9 than the light from light-emitting diode 2, a signal is obtained, after the formation of a quotient in quotient circuit 15, which signal is dependent on the measured quantity but independent of parameter variations of the fiber optics and the optoelectronics in the measuring device. The output signal from quotient device 15 is supplied to registering or indicating device 16, which thus shows the measured quantity.

Figure 1A:
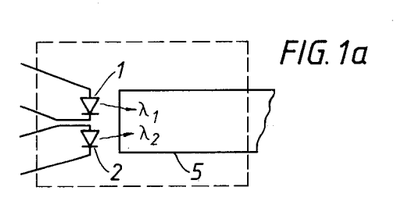
FIG. 1a shows a fiber end on the electronic unit side and FIG. 1b shows a temperature stabilizing measuring device.

One condition for the described method to provide complete compensation for micro-bending variations in the fiber optics is that the same set of modes is obtained from both light-emitting diodes 1 and 2, since otherwise micro-bending influences the light from the two light-emitting diodes differently, resulting in the quotient from divider 15 not being constant. To obtain identical sets of modes, light-emitting diodes with the same distribution of radiation are chosen, and possible mode mixing is performed by a suitable bending of fibers 3 and 4. If light-emitting diodes with well-defined light distributions are used, these can be mounted adjacent each other in front of the end of fiber 5, as is clear from FIG. 1a. This makes fiber optical branching redundant. It is also possible to locate photo-diode 18 in the vicinity of light-emitting diodes 1 and 2, thus making fiber 6 redundant. The end of fiber 5 may possibly be made conical in front of the light-emitting diodes to increase the switching-in of light. To ensure that the wavelength distribution of the light-emitting diode is constant, a temperature regulator may be used for stabilizing the temperature of the light-emitting diodes.

Figure 1B:
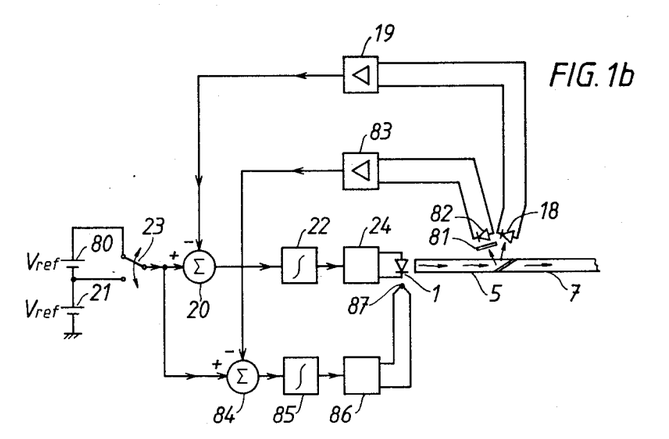

FIG. 1b shows a temperature regulator, which can be controlled either by the temperature of the light source or by the spectral distribution of the light from the light source. The latter type control is shown in FIG. (1b), where part of the light from light source 1, via fiber 5 and the section between fibers 5 and 7, is switched over to photo-detector 82 via filter 81. Filter 81 is chosen so that its transmission curve intersects the light spectrum of light source 1, so that a change of the spectrum of light source 1 results in a change of the photo-current of detector 82. The desired temperature stabilization is obtained through the feed-back coupling via amplifier 83, subtractor 84, regulator 85, and the drive circuit 86 to the Peltier element 87. FIG. 1b further shows how one and the same light source can be used to generate the different wavelength ranges required in the equipment. When switch 23 is in its down position, the light from light source 1 is controlled to a value corresponding to $V_{1ref}$, whereby light source 1 operates as a light-emitting diode and emits broad spectral light, the light thus being both reflected and transmitted by light-modulating filter 9, which is assumed to be of the interference type (See FIG. 1). When switch 23 is in its upper position, the light is controlled to a value corresponding to $V_{1ref}$ plus $V_{2ref}$, whereby light source 1 operates as a laser diode and emits a narrow spectrum which, depending on the choice of the filter, is either reflected or transmitted by filter 9.

To generate different spectra at different times, a so-called tunable diode laser can also be used. By modulating the wavelength of the diode laser over the spectral transmission edge of filter 9 (see FIG. 1), more or less light dependent signals are obtained in accordance with the movement of the filter, which light signals can be used for stabilizing the measuring device in a manner previously described.

FIG. 1 shows an arrangement in which stabilization of the optoelectronics and the fiber optic is obtained by time multiplexing of two light-emitting diodes and formation of the quotient between the light components from the transducer which emanate from the two light-emitting diodes.

Figure 2:
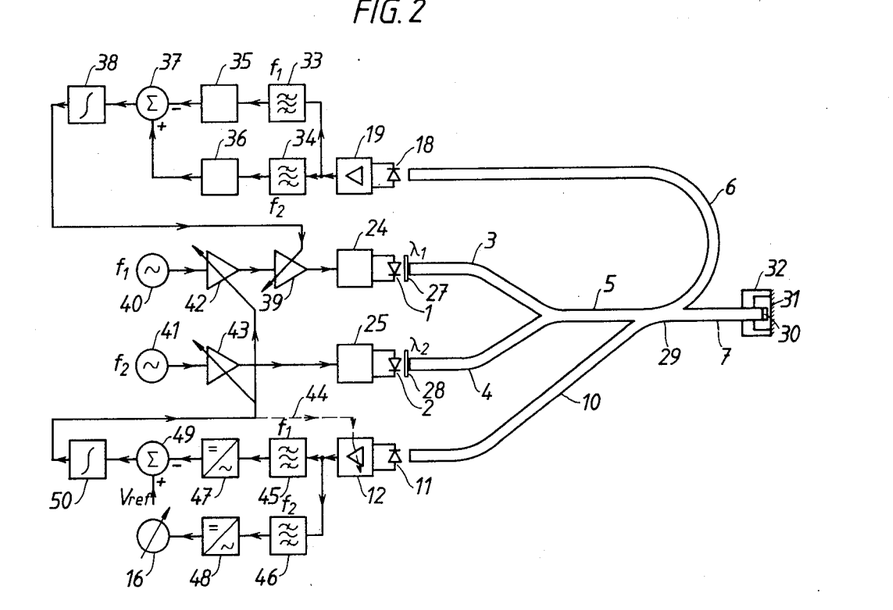
FIG. 2 shows a measuring device with frequency multiplex stabilization.

In FIG. 2 stabilization is carried out by frequency multiplexing instead of time multiplexing, and by amplification control instead of quotient formation. The light from light-emitting diodes 1 and 2 is allowed to pass through separate optical filters 27 and 28, respectively, to achieve well separated spectral distributions (with maximum at the wavelengths $\lambda_1$ and $\lambda_2$, respectively) before it is brought together into fiber 5 via fibers 3 and 4. Similarly as in FIG. 1, part of the light from fiber 5 is switched to fiber 6 and light detector 18, the output signal of which is amplified by amplifier 19. Light-emitting diodes 1 and 2 are modulated by oscillators 40 and 41, respectively, with the different frequencies $f_1$ and $f_2$, and so the output signal from amplifier 19 can be divided into two components by bandpass filters 33 and 34, where the output signal from bandpass filter 33 emanates from light-emitting diode 1 and the output signal from bandpass filter 34 emanates from light-emitting diode 2. After demodulation in demodulator circuits 35 and 36, the difference between the two components is taken by subtractor 37 and supplied to regulator 38, which controls controllable amplifier 39 in such a way that the output signal from subtractor 37 is maintained equal to zero. In this way, matching of light-emitting diodes 1 and 2 is obtained. Part of the light from fiber 5 is switched, via fiber 7, to transducer 32, which in this case consists of a pressure transducer with reflecting, pressure-sensing membrane 31. Between membrane 31 and the end surface of fiber 7, there is an optical filter which reflects and transmits varying amounts of the light from the two light-emitting diodes 1 and 2. Part of the light which is reflected back into fiber 7, either after reflection by filter 30, or transmission through filter 30, and reflection by specular membrane 31, is switched into fiber 10 and to light detector 11. The output signal from photodetector 11 is amplified by amplifier 12 and is divided by filters 45 and 46 into two components, emanating from light-emitting diodes 1 and 2, respectively. After demodulation by demodulator 47, the signal with modulation frequency $f_1$ is compared with a reference signal $V_{ref}$ in summator 49, and the difference obtained is supplied to regulator 50, which controls tandem amplifiers 42 and 43. Alternatively (see the dashed line 44) regulator 50 may control amplifier 12 via switch 44. This regulation compensates for parameter variations of the fiber optic and the optoelectronics in the measuring device. The compensating measuring signal is obtained after demodulation of the output signal from filter 46 via convertor 41, and the measuring signal can be read in indicating device 16.

Figure 3:
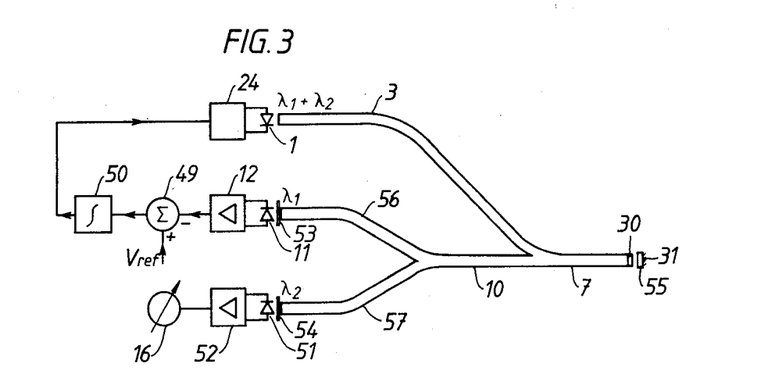
FIG. 3 shows a measuring device in which the light is divided into two wavelength ranges of filters at the photo-detectors.

FIG. 3 shows an arrangement, in which the division of the light into two wavelength ranges (which may be overlapping) takes place at the detector side instead of the light source side, as in FIGS. 1 and 2. The light from light source 1 is conducted via fiber 3 and fiber 7 to the transducer itself, which consists of temperature-sensitive material 55, placed in the path of the light beam between optical filter 30 at the fiber end and mirror 31.

Temperature-sensitive material 55 may, for example, be a semiconductor, the band gap, and thus light absorption, both of which are influenced by the temperature. The light reflected from filter 30 and mirror 31 is conducted back into fiber 7 and part of the light passes therefrom via fibers 10, 56 and 57 to filters 53 and 54 and to light detectors 11 and 51. Filter 53 is chosen so that it admits more of the light which is directly reflected into filter 30, whereas filter 54 admits more of the light which has been transmitted by filter 30, influenced by sensor 55 and reflected by mirror 31 back into fiber 7. After amplification in amplifier 12 and comparison with reference signal $V_{ref}$ in comparison device 49, the output signal from detector 11 is thus used to control light source 1 by means of regulator 50 so that compensation is obtained for instability of the fiber optic and optoelectronics. The signal from detector 51 constitutes the measuring signal, and because of the above-described regulating coil it will have a reduced dependence on the stability, if any, of the optoelectronics and fiber optics. As a light source there is suitably used a light-emitting diode with great half-width characteristics, but alternatively there may be used two light-emitting diodes with separate spectral distributions, matched to optic filters 30, 53 and 54.

In the measuring device according to FIG. 3, a good matching is required between photo-detectors 11 and 51. If this matching is not sufficient, an electronic matching stabilization can be performed according to the circuitry of FIG. 4, which also shows an alternative arrangement of the photo-diode. Via drive circuit 24, oscillator 40 modulates light source 1 which, via fibers 3 and 7, emits light to the transducer, which consists of optical filter 30, pressure-sensitive modulator 59 with reflecting rear side 31, glued on force cell 60 resting on base 61. Force F gives rise to mechanical stresses in modulator 59, and thus a changed absorption for the wavelength range used. The modulator may, for example, consist of a semiconductor having a pressure-dependent band gap. Therefore, light which is uninfluenced by the transducer and has been reflected by filter 30, as well as light which is influenced by the transducer and has been transmitted by filter 30 and modulator 59 and reflected by mirror 31, returns from the transducer back into fiber 7 to be forwarded to fiber 7 and the fibers 10 and 58.

Figure 4:
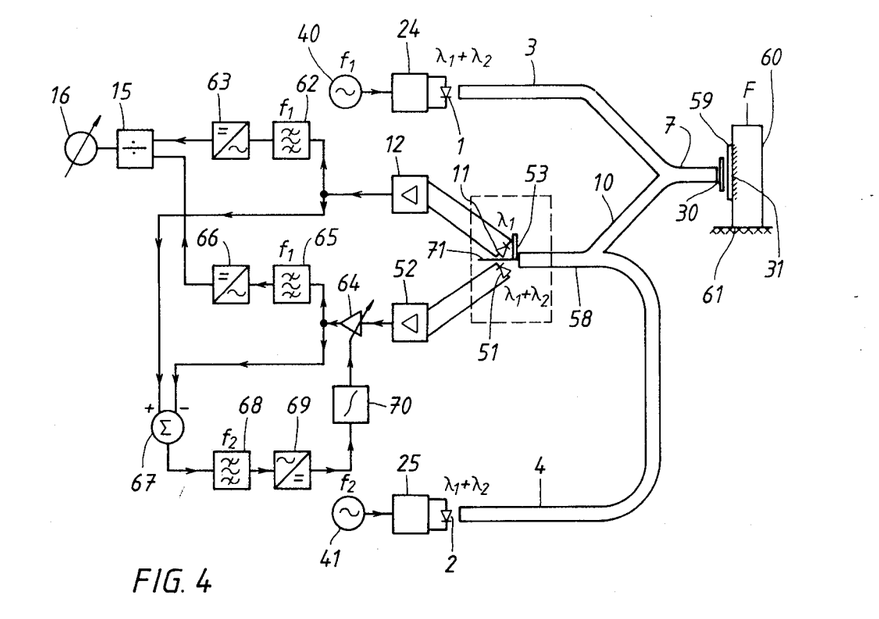
FIG. 4 shows a measuring device with electronic matching stabilization of light sources, etc.

At the end surface of fiber 58, there are two photo-diodes 11 and 51 separated by screen 71. The light to photo-diode 11 is filtered by optical filter 53, whereas the light to photo-diode 51 is unfiltered. This means that the measured quantity, with a suitable choice of light source 1, filter 30 and filter 53, influences photo-diodes 11 and 51 by varying degrees, and after filtering in filters 62 and 65, respectively, demodulation in demodulators 63 and 66, respectively, and quotient formation in divider 15, a measuring signal is therefore obtained which is compensated for instabilities of the optoelectronics and the fiber optics. To compensate for matching operation between photo-diodes 11 and 51, light source 2 emits light modulated by oscillator 41 into fiber 4 to fiber 58 and photo-detectors 11 and 51. The output signals from photo-detector amplifiers 12 and 52 are compared in subtracting device 67 and the signal obtained is filtered by filter 68 with respect to the signal from light source 2, demodulated in demodulator 69 and supplied to regulator 70, which adjusts controllable amplifier 64 such that the output signal therefrom is maintained equal to the output signal from amplifier 12 with respect to the signal component with frequency $f_2$. This ensures matched detector channels 11-12 and 51-64.

Figure 4A:
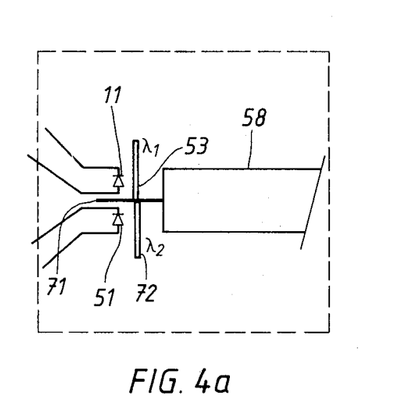
FIGS. 4a and 4b show two different filter arrangements for the photo-detectors.
Figure 4B:
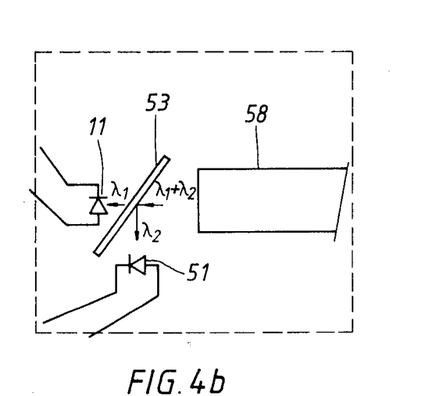

An an alternative of the light detector arrangment of FIG. 4 (marked by a dash-lined rectangle) the arrangements shown in FIGS. 4a and 4b can be used. FIG. 4a also shows filter 72 between fiber 58 and photo-detector 51. In FIG. 4b photo-detector 11 senses the light transmitted by filter 53, whereas photo-detector 51 senses the light reflected by the same filter.

Figure 5A:
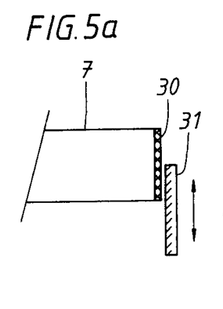
FIGS. 5a to 5l show various examples of sensor arrangements.

FIGS. 5a to 5l illustrate a summary of various sensor arrangements which may be used in the transducers in question. In all cases, except in FIGS. 5f and 5j, the measured quantity is converted into a mechanical movement, which is detected by a filter and mirror, or diffuser arrangement. In FIG. 5a filter 30, within a certain wavelength range of the attendant light, provides a dominating reflection, which is utilized to generate a reference signal which is less influenced by the measured quantity, and within another wavelength range it provides a dominating transmission, which causes a measuring signal reflected by mirror or diffuser 31.

Figure 6A:
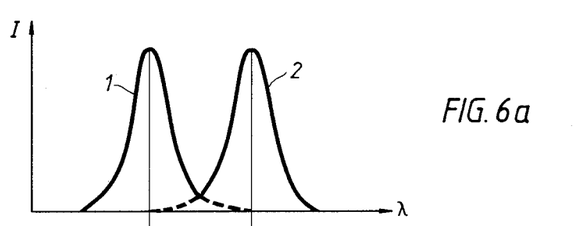
FIGS. 6a–6d, 7a–7c, 8a–8c and 9a–9d show curves for different spectral distributions when using different filters and light modulators.
Figure 6B:
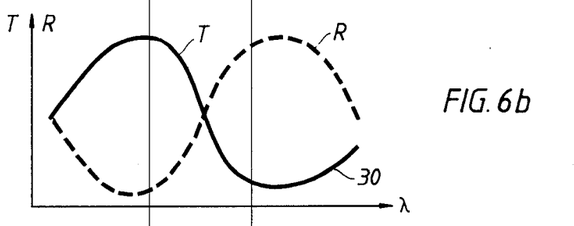
Figure 6C:
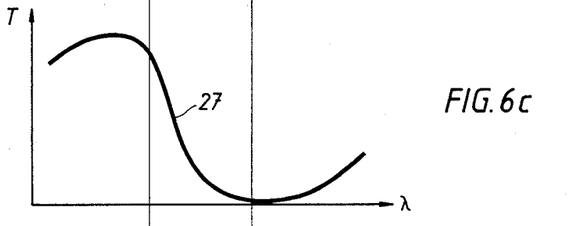
Figure 6D:
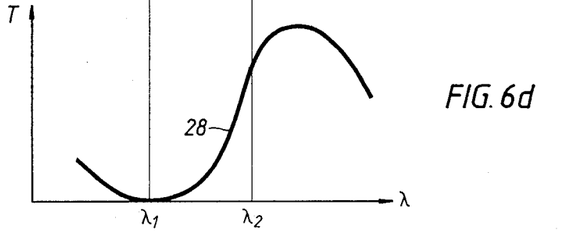

One example of how light sources and filters can be selected for the arrangement in FIG. 5a is shown in FIGS. 6a–6d, which are related to the measuring device according to FIG. 2. FIG. 6a shows the spectral distribution of light sources 1 and 2. The overlap of the light sources with respect to filter 30 is reduced by filters 27 and 28 according to FIGS. 6c and 6d, whereby the light from light source 1 is reflected only to a small extent by filter 30 in accordance with the reflection curve R in FIG. 6b (FIG. 2). The light from light source 2 is transmitted only to a small extent by filter 30 in accordance with the transmission curve T in FIG. 6b. Of course, filters 27 and 28 can be located on the photo-detector side according to FIGS. 3 and 4a. All the filters are suitably constructed as multi-layer interference filters.

Figure 5B:
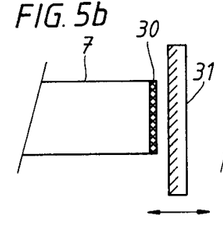
Figure 5C:
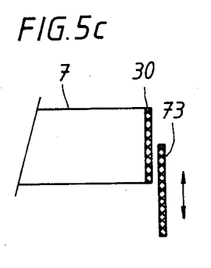
Figure 5D:
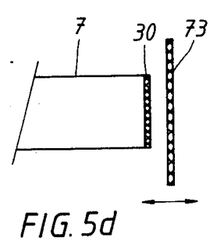
Figure 7A:
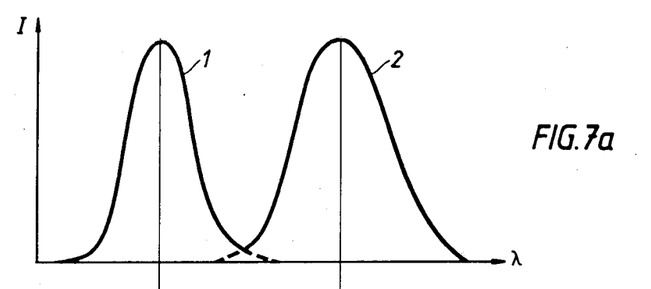
Figure 7B:
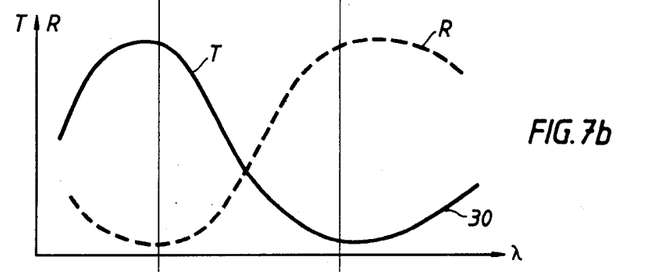
Figure 7C:
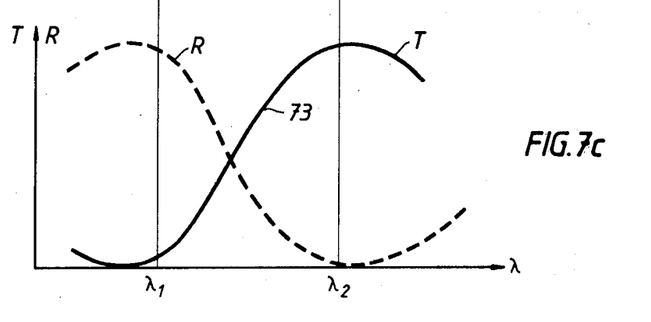

Instead of the measured quantity providing an upward-downward movement of mirror/diffuser 31 according to the arrow in FIG. 5a, the measured quantity can be converted into a movement in the lateral direction according to FIG. 5b. Mirror/diffuser 31 in FIGS. 5a and 5b may be replaced with filter 73 according to FIGS. 5c and 5d, so that filter characteristics according to FIGS. 7a–7c can be used. The light from light source 1 (around $\lambda_1$) is transmitted by filter 30 (7b) and is reflected by filter 73 (7c), whereas the light from light source 2 (around $\lambda_2$) will be reflected by filter 30 (FIG. 7b) and transmitted by filter 73 (FIG. 7c). This results in an improved separation between the reference and measuring signals from the transducer.

Figure 5E:
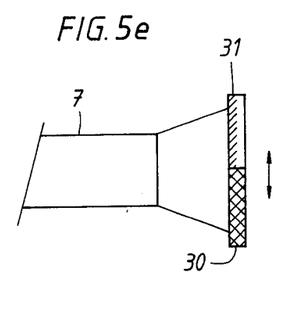

An additional modulator arrangement is shown in FIG. 5e, in which both filter 30 and mirror 31 are movable. Because filter 30 reflects light of different wavelengths to a varying degree, which is not the case with mirror or diffuser 31, both measuring and reference signals are obtained. Note the distance between the fiber end and the mirror/filter, through which the modes of higher order and the edge rays from the fiber are sorted out.

Figure 5F:
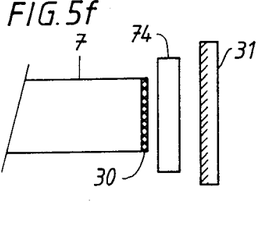
Figure 8A:
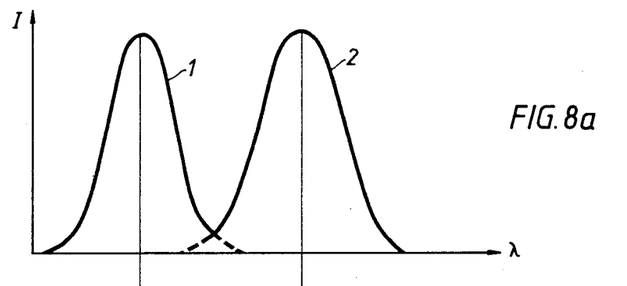
Figure 8B:
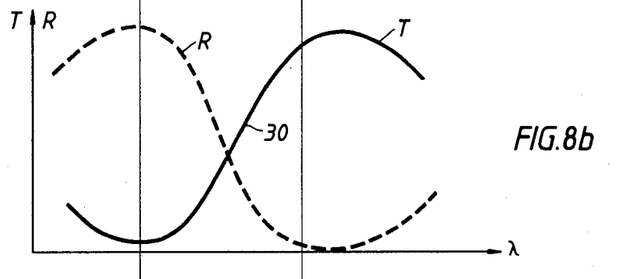
Figure 8C:
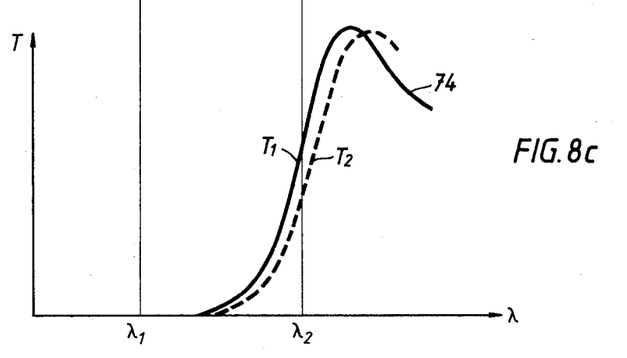

In addition to sensing mechanical movements, the filter technique can also be used for sensing changes of the absorption of a material 74 according to FIG. 5f. The characteristics occurring are shown in FIGS. 8a–8c. The light from light source 2 (FIG. 8a) is transmitted by filter 30 (FIG. 8b) and to a certain extent by sensor material 74 (FIG. 8c). How much is transmitted by the sensor material depends on the measured quantity, which may be temperature, pressure or magnetic or electric field strength, and for one value of the measured quantity the transmission may follow curve $T_1$, and for another value it may follow curve $T_2$ according to FIG. 8c. The light from light source 1 (FIG. 8a) is reflected by filter 30 (FIG. 8b) and absorbed by sensor material 74, so only a very small influence from the measured quantity is obtained.

Figure 5G:
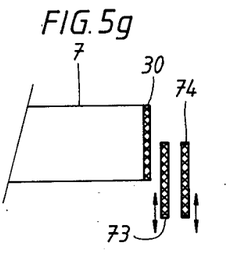
Figure 5H:
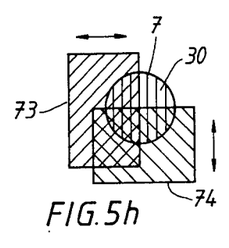
Figure 9A:
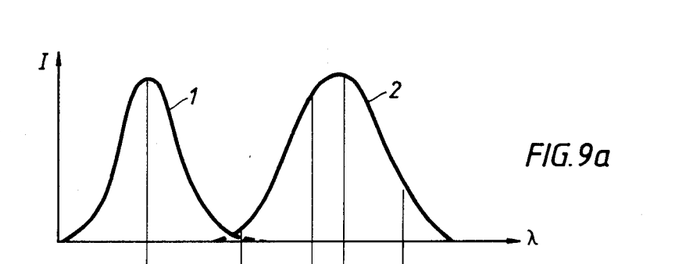
Figure 9B:
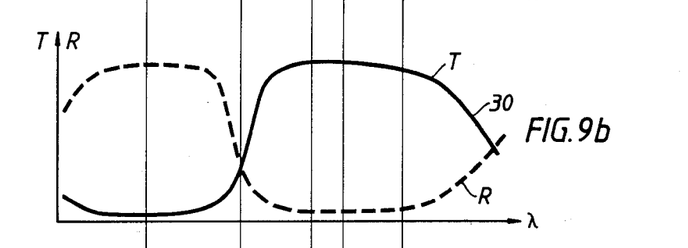
Figure 9C:
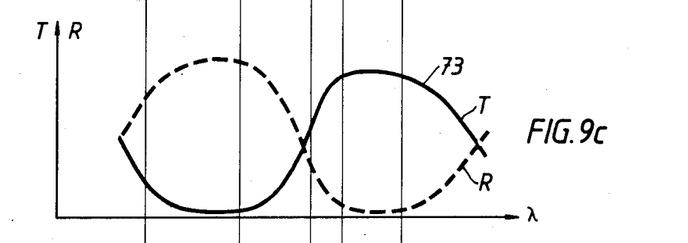
Figure 9D:
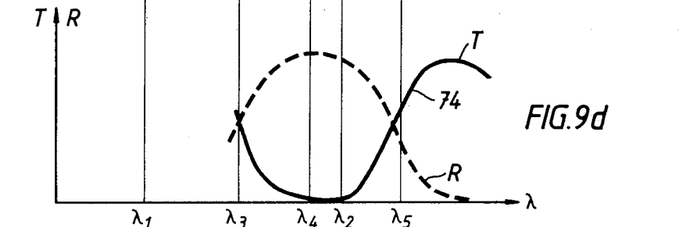

Alternatively, mirror 31 may consist of a reflecting filter for further separation of the wavelength. By using a fixed filter 30 and several movable filters 73, 74 and so on, information about several measured quantities can be transmitted by the same fiber 7. In FIG. 5g filters 73 and 74 both move up-down, and in FIG. 5h filter 73 moves in the x-direction and filter 74 in the y-direction. Possible filter characteristics are shown in FIGS. 9a–9d. Light source 1 (FIG. 9a) substantially gives reflection by filter 30 (FIG. 9b), whereas light source 2 gives reflection in the wavelength interval $\lambda_3$–$\lambda_4$ by filter 73 (FIG. 9c) and in the wavelength interval $\lambda_4$–$\lambda_5$ by filter 74 (FIG. 9d). By providing the photo-detectors with filters for the corresponding wavelength intervals, the individual movements of filters 73 and 74 may be extracted from the light reflected to fiber 7.

Figure 5I:
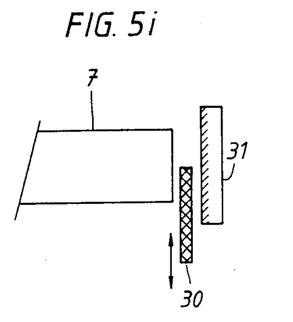
Figure 5J:
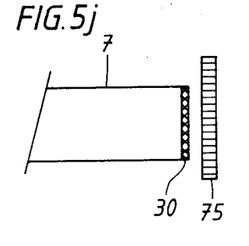

If absorption filters are used, the arrangement with movable filter 30 and fixed mirror 31 according to FIG. 5i may be used. Further, FIG. 5j shows an arrangement with optic modulator 75, the reflection spectrum of which is changed with the measured quantity.

Figure 5K:
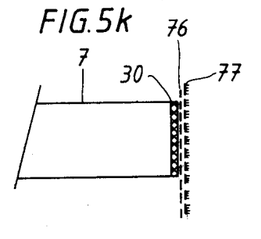
Figure 5L:
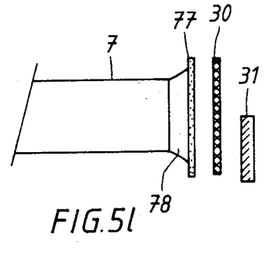

When a greater resolution is desired in a mechanical arrangement, modulation can be performed by two screen patterns 76 and 77 which are movable with respect to each other and located in front of filter 30 (FIG. 5k). The measured quantity causes screen 77 with reflecting strips to move relative to screen 76 with absorbing strips. In addition to increased resolution, improved linearity will be obtained as well as less influence of the distribution of modes of the light. The latter can also be obtained by means of a diffuser or screen 77, applied against the fiber end with index-matching medium 78 (see FIG. 5l). Filter 30 is located after 77 so that both the reference light from filter 30 and the measured light from mirror 31 have to pass through diffuser/filter 77.

Figure 10:
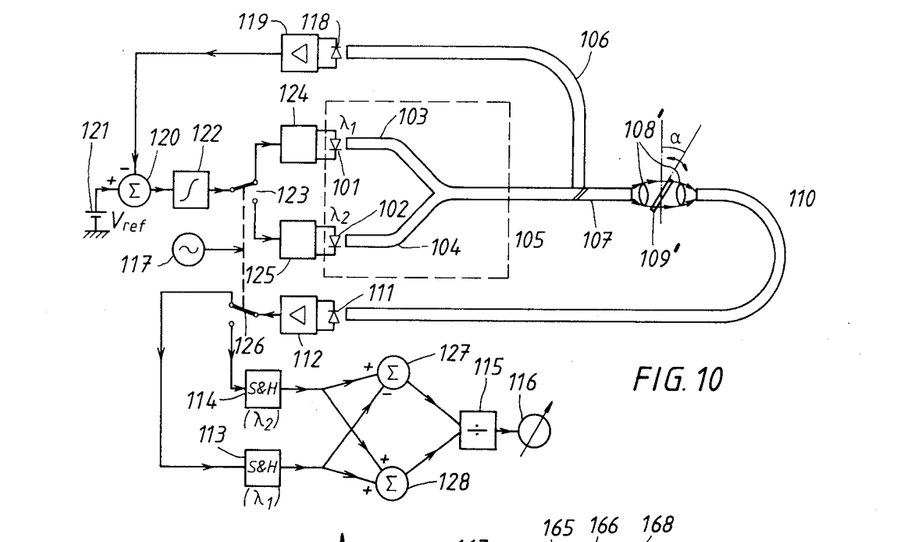
FIG. 10 shows an alternative measuring device with two light sources and a tunable interference filter.
Figures 11, 12:
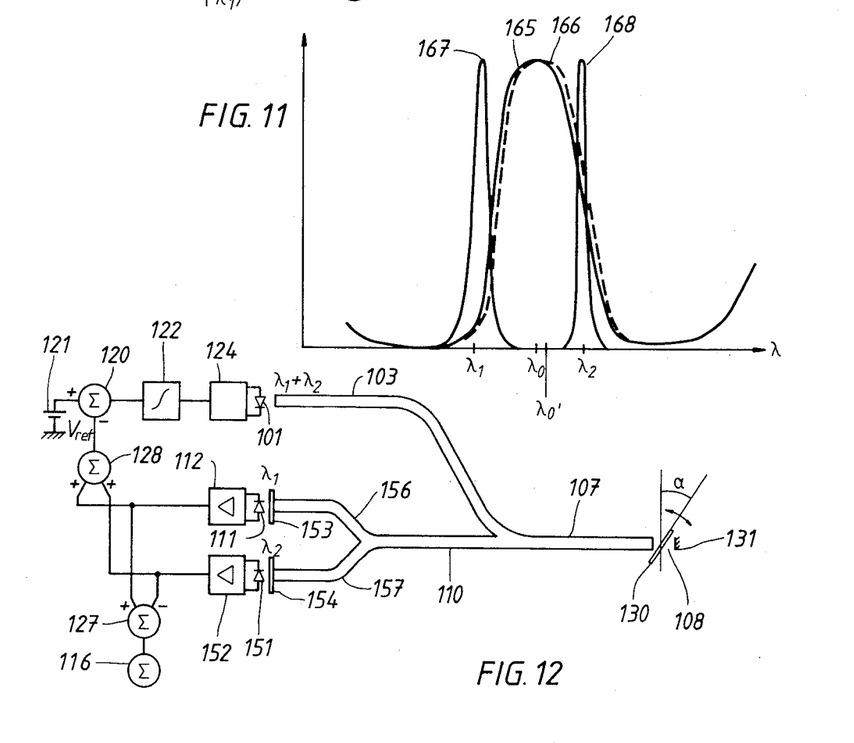
FIG. 11 shows the emission curves of the light sources and the transmission curve of the filter for the measuring device of FIG. 10.
FIG. 12 shows an alternative embodiment of FIG. 10.

FIG. 10 shows a measuring device having two light sources 101 and 102, which emit light with different wavelength distributions (maximum at $\lambda_1$ and $\lambda_2$, respectively) into light conducting fibers 103 and 104, respectively, which are united into fiber 105. From fiber 105 part of the light is switched via fiber 106 to light detector 118, the photo-current of which is amplified by amplifier 119 and supplied to subtractor 120, which forms the difference between reference voltage 121 ($V_{ref}$) and the output signal from amplifier 119. That difference constitutes the error signal to regulator 122, which controls light-emitting diode 101 via drive circuit 124, or light-emitting diode 102 via drive circuit 125, depending on the position of switch 123. This manner of control ensures that the ratio between the light intensities from light-emitting diodes 101 and 102 is kept constant when switch 123 is controlled between its two positions by oscillator 117 (compare FIG. 1). From fiber 105, part of the light from light-emitting diodes 101 and 102 is switched to fiber 107, which conducts the light to the proper transducer. The transducer consists of two lenses 108′, between which rotatable interference filter 109′ is located. The light which passes through filter 109′ and enters fiber 110 is conducted thereby to light detector 111, the output signal of which is amplified in amplifier 112 and is applied by switch 126 alternately to sample and hold circuits 113 and 114 accordingly as switch 123 switches in light-emitting diode 110 or 102, respectively. In this way the output of sample and hold circuit 113 will acquire a value of the light intensity from light-emitting diode 101 after passage through light conductors 103, 105, 107, 110 and the transducer. The output of sample and hold circuit 114 will acquire a value of the light intensity from light-emitting diode 102 after passage of the light through conductors 104, 105, 107, 110 and the transducer. In the transducer the angular position of interference filter 109′ is influenced by the measured quantity. By selecting the spectral transmission curves 165 of interference filter 109′ and the emission curves 167 and 168 of light sources 101 and 102 as shown in FIG. 11, a reduction of the angle α according to FIG. 10 will transfer the transmission curve of the interference filter towards greater wavelengths according to the dash-lined curve 166, whereby the transmission of the light from light source 101 will decrease and the transmission of the light from light source 102 will increase. This fact is utilized, on the one hand, for obtaining a measuring signal, representative of the rotation of the filter, and on the other hand for obtaining a reference signal for compensation of the instability of the light sources, the fiber optics and the detector. By means of subtractor 127 (FIG. 10) the difference between the signals from sample and hold circuits 113 and 114 is estimated, which circuits contain the values of the light signals emanating from light sources 102 and 101, respectively. This difference is very much dependent on the angular position of interference filter 109′ and thus on the measured quantity.

Summation device 128 from the sum of the light signals from the two light sources, and since the transmission of the light from one light source increases when the transmission of the light from the other light source decreases, or vice versa, when the angular position of the interference filter is changed, the output signal from summation device 128 will have a small dependence on the measured quantity and can therefore be utilized as a reference signal. By forming the quotient in divider 115 between the differenced and summed signals, a measuring signal is received by indicating device 116 which is compensated for the previously mentioned instabilities in the measuring equipment. Instead of separating the light signals from the two light sources by means of switches 123 and 126 and sample and hold circuits 113 and 114, i.e. by time division multiplexing, frequency division multiplexing may be used. When frequency division multiplexing is used, switch 123 is replaced by two oscillators, which, with different frequencies, modulate light sources 101 and 102, while at the same time the sample and hold circuits are replaced by electric filters and demodulators, which separate and demodulate the signals from the two light sources.

Figure 13:
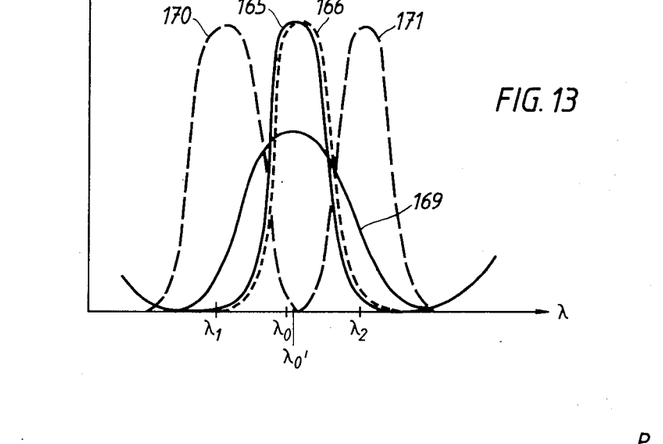
FIG. 13 shows the emission curves of the light sources and the transmission curves of the filter for the measuring device of FIG. 12.

FIG. 12 shows a measuring device with the same basic principle of operation as in FIG. 10 but with a somewhat different realization. Either a broad spectral light source according to the emission spectrum 169 in FIG. 13, or two light sources according to the emission spectra 167 and 168, respectively, in FIG. 11 are used as light sources. The light from the light source is conducted in fiber 3 via a branch of fiber 107, which switches the light into the transducer. In addition to interference filter 130, the transducer consists of air gap 108 between the end surface of fiber 107 and mirror 131 which reflects back part of the light into fiber 107 and to fiber 110, from where the light is branched off into fibers 156 and 157, which lead to filters 153 and 154. The transmission curves for these elements are shown in FIG. 13, where curve 170 corresponds to filter 153 and curve 171 corresponds to filter 154. As the interference angle $\alpha$ is reduced, the transmission curve of the interference filter is displaced towards greater wavelengths, illustrated by transmission curve 166. This means that less light will be transmitted through filter 153 (curve 170) and that more light will be transmitted through filter 154 (curve 171), provided that the light source has sufficient spectral width. Thus, a reference signal can be obtained directly from the sum of the output signals from detector amplifiers 112 and 152, which amplify the detector signals from detectors 111 and 151, respectively. This reference signal is formed in summation device 128, the output signal of which is compared with reference signal $V_{ref}$ (from 121) in subtractor 120. Subtractor 120 is connected to regulator 122, which controls light source 101 through drive circuit 124 so that the output signal from summator 128 is maintained equal to $V_{ref}$. The measuring signal is obtained from subtractor 127 and is supplied to registering or indicating device 116.

Figure 14A:
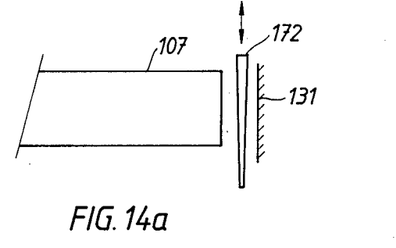
FIGS. 14a–14c show different filter configurations for the measuring device of FIG. 11 or 12.
Figure 14B:
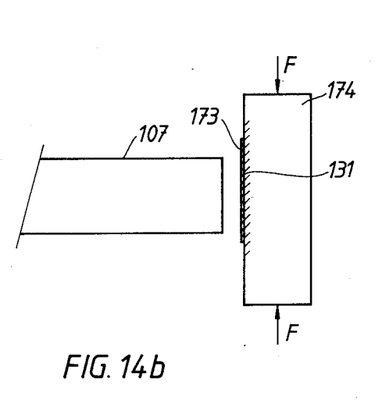
Figure 14C:
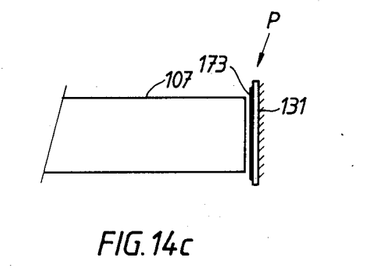

The measuring devices described in FIGS. 10 and 12 can be used for measuring most physical magnitudes which are capable of being transformed into a mechanical angular motion. The light-modulating interference filter is thus mounted in such a way that reproducible rotating movements can be obtained. This can be achieved, for example, by a center point bearing, torsion suspension, bending suspension or buckling suspension. However, the displacements of the spectral transmission curve of the interference filter, described in FIGS. 11 and 13, can be achieved in other ways than by rotating the filter. Thus, FIG. 14a shows how a translatory movement of filter 172 can provide a light modulation according to the previous description (see the double arrow) if the optical wavelength in the interference layers, which comprise the interference filter, varies with the filter in the direction in which the displacement is made. It is also possible to influence the optical wavelength by introducing mechanical stresses in the interference layers, which according to FIG. 14b can be applied directly on body 174 which is subjected to the force F that is to be measured. The interference filter then acts as an elongation transducer. Further, filter 173 according to FIG. 14c is able to sense the ambient pressure and the ambient temperature through the dependence of the optical wavelength on these magnitudes.

Figure 15:
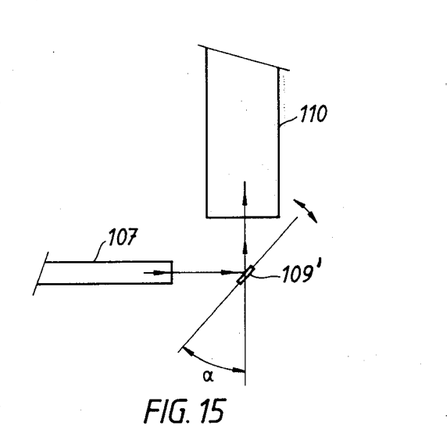
FIG. 15 illustrates an embodiment using the reflection spectrum of an interference filter.

Finally, FIG. 15 shows how the spectrum of reflection of the interference filter can be used to obtain the same type of light modulation as has been described for FIGS. 10 and 12. The light from fiber 107 (see FIG. 10) is reflected against filter 109' to fiber 110, whereby the spectral distribution of the reflecting light can be displaced by changing the angle $\alpha$.

Using the spectrum of reflection, however, involves the difficulty that, in addition to the described modulation of the spectrum, a modulation of the connection between fiber 107 and 110 is obtained as well. To overcome this to a certain extent, FIG. 15 shows the use of fiber 107 having a small diameter for leading in light and fiber 110 having a large diameter and a large numerical aperture for leading out light. As an alternative, fiber 107 can be replaced by a fiber having a larger diameter if fiber 110 is replaced with a cubic corner reflector. This causes fiber 107 to lead in light as well as to lead out light.

What is claimed is:

1. Optical measuring apparatus for measuring physical magnitudes, comprising:
   electronic circuit means including at least one light source for emitting light and means for processing measuring signals;
   a transducer for receiving said emitted light and including an optical modulator responsive to optical signals representing the measured physical magnitudes for modulating the light emitted from said at least one light source;
   at least one optical fiber for conducting light between said at least one light source and said transducer;
   said transducer further including at least one optical filter having a spectrally-varying absorbing, transmitting or reflecting characteristic within the spectra of the light emitted by said at least one light source, said at least one optical filter being positioned in the path of the light emitted from the transducer to generate at least one optical stabilization signal for stabilizing the optical signals in said at least one optical fiber and said means for processing measuring signals, and said at least one optical filter generating at least one optical measuring signal, said at least one fiber end in said transducer including an interference filter positioned adjacent thereto for generating a light signal in one wavelength range less dependent on the measured physical magnitude than the light within another, non-identical wavelength range of the light emanating from said transducer, the optical wavelength of said interference filter is changed by mechanical stresses induced in the interference layers thereof; and
   said means for processing including means for detecting said at least one optical measuring signal.

2. Optical measuring apparatus according to claim 1, wherein at least one light source is at least one light-emitting diode, and said means for detecting the light passed out from said transducer is at least one photodiode.

3. Optical measuring apparatus according to claim 1, wherein said at least one light source and means for detecting each include an optical filter.

4. Optical measuring apparatus according to claim 1, wherein said at least one optical filter includes fiber ends located in the light beam path in said transducer, the variations of the measured physical magnitudes causing relative motion between the fiber ends.

5. Optical measuring apparatus according to claim 1, wherein said transducer further includes mirrors located in the light beam path in said transducer, the variation of the measured physical magnitudes causing relative motion between said mirrors.

6. Optical measuring apparatus according to claim 1, wherein said transducer further includes screen portions located in the light beam path in said transducer, the variations of the measured physical magnitudes causing relative motion between said screen patterns.

7. Optical measuring apparatus according to claim 1, wherein said transducer further includes diffuser plates located in the light beam path in said transducer, the variations of the measured physical magnitudes causing relative motion between said diffuser plates.

8. Optical measuring apparatus according to claim 1, wherein said transducer further includes optical filters located in the light beam path in said transducer, the variations of the measured physical magnitudes causing relative motion between said optical filters.

9. Optical measuring apparatus according to claim 1, wherein said optical modulator is positioned in the optical beam path within said transducer and the variations of the measured physical magnitudes alter the optical modulating characteristic of said optical modulator.

10. Optical measuring apparatus according to claim 1, wherein said at least one optical filter is responsive to the measuring signals, and the light in the transducer is modulated by varying the optical distance of the light in the interference layers of said interference filter.

11. Optical measuring apparatus according to claim 1, wherein at least one fiber end of said at least one optic fiber adjacent said transducer is provided with said interference filter.

12. Optical measuring apparatus according to claim 10, further comprising means for rotating said interference filter.

13. Optical measuring apparatus according to claim 10, further comprising means for displacing portions of said interference filter perpendicular to the beam path in said transducer to vary the optical distance in the different portions thereof.

14. Optical measuring apparatus according to claim 10, wherein the optical wavelength of said interference filter is changed by mechanical stresses induced in the interference layers thereof.

15. Optical measuring apparatus according to claim 10, wherein the optical wavelength of said interference filter is varied by temperature.

16. Optical measuring apparatus according to claim 12, wherein said electronic circuit means includes means for measuring the transmission characteristic of the interference filter in at least two non-identical, wavelength ranges.

17. Optical measuring apparatus according to claim 2 with at least two of said light sources and further comprising means for time division multiplexing said at least two light sources, and said electronic circuit means includes means for demultiplexing the light passed out from said transducer.

18. Optical measuring apparatus according to claim 2 with two of said light sources and further comprising means for maintaining the light intensities of said two light sources constant with respect to each other.

19. Optical measuring apparatus according to claim 2 with two of said photo-diodes and wherein said electronic circuit means includes means for achieving matching between said two photo-diodes, said means being adapted to supply light with a certain modulation frequency to said photo-diodes with a constant ratio in accordance with a difference signal from said photo-diodes with respect to said modulation frequency, and further comprising means for demodulating the signals from said photo-diodes, amplifier means for amplifying at least one of the photo-diode outputs, and means for regulating said amplifier means to reduce said difference signal to zero.

20. Optical measuring apparatus according to claim 2, further comprising means for temperature stabilizing said at least one light source.

21. Optical measuring apparatus according to claim 2 with at least two of said photo-diodes and further comprising fiber optic branches for optically interconnecting said at least one light source and said at least two photo-diodes and said transducer, and further comprising means for controlling the light mode sets of said at least one light source, at said fiber optic branches, at said photo-detectors and at said transducer.

22. Optical measuring apparatus according to claim 18, wherein said means for maintaining includes means for regulating said at least one light source, and means for detecting light from said transducer to control said means for regulating. determining the sum of the values to form a stabilizing signal.

23. Optical measuring apparatus according to claim 16, wherein said wavelength ranges at least partly fall within one of the spectral transmission peaks of said interference filter, and that said wavelength ranges are located at either side of the maximum of said peak.

24. Optical measuring apparatus according to claim 16, further comprising means for determining the difference between the values of said transmission characteristic in each of said wavelength ranges to form a measuring signal and means for determining the sum of the values of form a stabilizing signal.

25. Optical measuring apparatus according to claim 17 or 24 wherein said means for detecting includes means for dividing the output of said at least one photo-diode.

26. Optical measuring apparatus according to claim 17 or 24, further comprising means for regulating said at least one light source and being responsive to said means for detecting.

* * * * *